(12) United States Patent
Cross et al.

(10) Patent No.: US 7,955,576 B2
(45) Date of Patent: Jun. 7, 2011

(54) PROCESS FOR THE REMOVAL OF HEAVY METALS FROM GASES

(75) Inventors: Joseph B. Cross, Bartlesville, OK (US); Glenn W. Dodwell, Bartlesville, OK (US); Marvin M. Johnson, Bartlesville, OK (US); Edward L. Sughrue, II, Bartlesville, OK (US); Jianhua Yao, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 379 days.

(21) Appl. No.: 12/335,713

(22) Filed: Dec. 16, 2008

(65) Prior Publication Data

US 2009/0092528 A1    Apr. 9, 2009

Related U.S. Application Data

(62) Division of application No. 10/735,557, filed on Dec. 12, 2003, now Pat. No. 7,585,487.

(51) Int. Cl.
*B01D 47/00* (2006.01)

(52) U.S. Cl. .................................... 423/210; 423/213.2

(58) Field of Classification Search .................. 423/210, 423/213.2; 588/411, 414
See application file for complete search history.

(56) References Cited

U.S. PATENT DOCUMENTS 7,585,487 B2 *   9/2009   Sughrue et al. ............ 423/594.8

* cited by examiner

*Primary Examiner* — Edward M Johnson

(57) ABSTRACT

A composition, containing vanadium and a support, wherein at least a portion of the vanadium has crystallite sizes of less than about 100 Å as determined by an analytical method such as X-Ray Diffraction, is disclosed. A method of preparing such composition is also disclosed. The composition is employed in a process to remove a heavy metal from a gaseous feed stream which can optionally include a separate mercury adsorption stage.

20 Claims, No Drawings

PROCESS FOR THE REMOVAL OF HEAVY METALS FROM GASES (New) This is a divisional of application Ser. No. 10/735,557 filed Dec. 12, 2003, now allowed.

The invention relates to a composition useful in the removal of heavy metals from a gaseous feed stream. In one aspect the invention relates to a method of preparing such composition. In yet another aspect the invention relates to a process for removing heavy metals from a gas stream using the inventive composition and, optionally, a second stage adsorption of the heavy metal.

BACKGROUND OF THE INVENTION

Heavy metals are released during the combustion process of many fossil fuels and/or waste materials. These heavy metals include, for example, arsenic, beryllium, lead, cadmium, chromium, nickel, zinc, mercury and barium. Most of these heavy metals are toxic to humans and animals. In particular, lead is thought to compromise the health and mental acuity of young children and fetuses.

Furthermore, there is every indication that the amount of mercury, and possibly of other heavy metals, now legally allowed to be released by those combusting various fossil fuels and/or waste materials, including coal burning powerplants, and petroleum refineries, will be reduced by future legislation. While a variety of adsorbents are available for capture of heavy metals (in particular mercury), these adsorbents tend to have low capacities and are easily deactivated by other components in the gas stream, such as sulfur oxides. We have discovered a material that converts an elemental heavy metal to an oxidation state greater than zero, even in the presence of sulfur oxides.

SUMMARY OF THE INVENTION

It is an object of this invention to provide an improved vanadium material which when used in the removal of heavy metal results in oxidation of the heavy metal to an oxidation state greater than zero, even in the presence of sulfur oxides and nitrogen oxides.

A further object of this invention is to provide a method for making an improved vanadium material which when used in the removal of heavy metal results in oxidation of the heavy metal to an oxidation state greater than zero, even in the presence of sulfur oxides and nitrogen oxides.

Another object of this invention is to provide an improved process for the removal of heavy metal from a heavy metal-containing gas which results in oxidation of the heavy metal to an oxidation state greater than zero, even in the presence of sulfur oxides and nitrogen oxides, with an optional second stage for adsorption of oxidized heavy metal.

In accordance with a first embodiment of the invention, the inventive composition comprises vanadium and a support selected from the group consisting of: 1) amorphous silica-alumina; 2) a zeolite; 3) a material comprising meta-kaolin, alumina, and expanded perlite; 4) alumina; and 5) combinations thereof, wherein at least a portion of the vanadium has crystallite sizes of less than about 100 Å as determined by an analytical method such as X-Ray Diffraction.

In accordance with a second embodiment of the invention, the inventive composition comprises vanadium and a support selected from the group consisting of: 1) amorphous silica-alumina; 2) a zeolite; 3) a material comprising meta-kaolin, alumina, and expanded perlite; 4) alumina; and 5) combinations thereof; heated in the presence of oxygen and a solvent to a calcination temperature; wherein the calcination temperature is sufficient to volatilize and remove substantially all of the solvent; and wherein said calcination temperature is below the temperature which would result in the conversion of greater than about 90 weight percent of the vanadium to vanadium-and-oxygen containing crystalites greater than about 100 Å in size.

In accordance with a third embodiment of the invention, the inventive composition can be prepared by the method of:
a) incorporating a vanadium compound onto, into, or onto and into a support selected from the group consisting of: 1) amorphous silica-alumina; 2) a zeolite; 3) a material comprising meta-kaolin, alumina, and expanded perlite; 4) alumina; and 5) combinations thereof, in the presence of an oxidizing agent and a solvent, to thereby form a vanadium incorporated support; and
b) calcining the vanadium incorporated support at a calcination temperature; wherein the calcination temperature is sufficient to volatilize and remove substantially all of the solvent; and wherein the calcination temperature is below the temperature which would result in the conversion of greater than about 90 weight percent of the vanadium to vanadium-and-oxygen-containing crystallites greater than about 100 Å in size, to thereby form the composition.

In accordance with a fourth embodiment of the invention, the inventive composition can be used in the removal of heavy metal from a gaseous feed stream comprising heavy metal by contacting, under heavy metal removal conditions, the gaseous feed stream with any of the inventive compositions of embodiments one through three above, with an optional second stage for adsorption of oxidized heavy metal.

Other objects and advantages of the invention will become apparent from the detailed description and the appended claims.

DETAILED DESCRIPTION OF THE INVENTION

The inventive composition comprises, consists of, or consists essentially of a support and vanadium.

The support is selected from the group consisting of: 1) amorphous silica-alumina; 2) a zeolite; 3) a material comprising, consisting of or consisting essentially of alumina, expanded perlite and meta-kaolin; 4) alumina; and 5) combinations thereof. As used in this disclosure, the term "Support" refers to a carrier for another catalytic component. However, by no means is a support necessarily an inert material; it is possible that a support can contribute to catalytic activity and selectivity.

The vanadium is present in said composition, on an elemental vanadium basis, in an amount in the range of from about 0.5 to about 50 weight %, preferably from about 1 to about 20 weight %, and most preferably from about 1.5 to about 15 weight %, based on the total weight of the composition.

In accordance with the first embodiment of the present invention the composition comprises, consists of or consists essentially of vanadium and a support, as above described, wherein at least a portion, preferably at least about 10 weight percent, more preferably at least about 80 weight percent, and most preferably at least about 95 weight percent, of the vanadium of the composition has a crystalite size less than about 100 Å, more preferably less than about 30 Å, and most preferably less than about 20 Å as determined by an analytical method such as X-Ray diffraction.

In accordance with the second embodiment of the present invention, the composition is preferably heated in the presence of oxygen and a solvent to a calcination temperature.

The calcination temperature is preferably sufficient to volatilize and remove substantially all of the solvent, more preferably greater than about 125° C., and most preferably greater than about 150° C. The calcination temperature is also preferably below the temperature which would result in the conversion of greater than about 90 weight percent of the vanadium to vanadium-and-oxygen-containing crystallites greater than about 100 Å in size; more preferably below about 400° C.; even more preferably below about 375° C.; and most preferably below about 350° C. The solvent is preferably an aqueous solution of oxalic acid.

The composition is preferably heated, as described above, for a time period in the range of from about 0.1 hours to about 24 hours, and more preferably in the range of from about 1 hour to about 4 hours.

In accordance with the third embodiment of the present invention, the inventive composition can be prepared by the method of, and a method is provided including:

a) incorporating a vanadium compound onto, into, or onto and into a support selected from the group consisting of: 1) amorphous silica-alumina; 2) a zeolite; 3) a material comprising meta-kaolin, alumina, and expanded perlite; 4) alumina; and 5) combinations thereof, in the presence of an oxidizing agent and a solvent, to thereby form a vanadium incorporated support; and b) calcining the vanadium incorporated support at a calcination temperature; wherein the calcination temperature is sufficient to volatilize and remove substantially all of the solvent, more preferably greater than about 125° C., and most preferably greater than about 150° C.; and wherein the calcination temperature is below the temperature which would result in the conversion of greater than about 90 weight percent of the vanadium to vanadium-and-oxygen-containing crystallites greater than about 100 Å in size, more preferably below about 400° C.; even more preferably below about 375° C.; and most preferably below about 350° C.

The vanadium compound can be any vanadium containing compound capable of incorporation onto and/or into a support. Preferably, the vanadium compound is selected from the group consisting of 1) ammonium metavanadate, 2) an alkali metavanadate of the formula $MVO_3$, wherein M can be an alkali metal selected from Group IA, and combinations thereof; and 3) combinations of any two or more thereof. The most preferable vanadium compound is ammonium metavanadate.

The oxidizing agent can be any agent capable of oxidizing vanadium, and preferably is hydrogen peroxide or oxygen. The solvent is preferably an aqueous solution of oxalic acid. Also, the calcination time period is as described in the second embodiment.

Also, preferably the support comprises alumina, meta-kaolin, and expanded perlite, and is prepared by the method of:

1) adding expanded perlite to a mixture of alumina and water to thereby form a second mixture;

2) adding meta-kaolin to the second mixture to thereby form a third mixture;

3) adding a dispersant to the third mixture to thereby form a fourth mixture; and 4) calcining the fourth mixture to thereby form the support.

The calcining of step 4) preferably comprises heating the fourth mixture to a temperature in the range of from about 100° C. to about 200° C. for a first time period in the range of from about 0.5 hour to about 2 hours; and subsequently heating the fourth mixture to a temperature in the range of from about 500° C. to about 750° C. for a second time period in the range of from about 0.5 hour to about 2 hours.

In accordance with the fourth embodiment of the present invention, the inventive composition can be used in the removal of heavy metal from a gaseous feed stream comprising heavy metal by a process comprising, consisting of, or consisting essentially of contacting, in a contacting zone, under heavy metal removal conditions, the gaseous feed stream with any of the inventive compositions, and combinations thereof, of embodiments one through three above. A gaseous product stream is withdrawn from the contacting zone. The gaseous feed stream is typically a combustion gas; and is more typically a stack gas derived from the combustion of coal. The gaseous feed stream can also further comprise compounds selected from the group consisting of sulfur oxides, $CO_2$, water, nitrogen oxides, HCl, and combinations of any two or more thereof.

The contacting of the gaseous feed stream with the inventive composition is preferably carried out at a temperature in the range of from about 100 to about 325° C., more preferably from about 125 to about 275° C., and most preferably from about 150 to about 225° C.

The heavy metal typically comprises a metal selected from the group consisting of arsenic, beryllium, lead, cadmium, chromium, nickel, zinc, mercury, barium, and combinations of any two or more thereof. The heavy metal most typically comprises mercury.

When the heavy metal is mercury, the mercury is typically present in the gaseous feed stream in an amount in the range of from about 0.1 to about 10,000 $\mu g/m^3$, more typically in the range of from about 1 to about 800 $\mu g/m^3$ and most typically from about 3 to about 700 $\mu g/m^3$.

The composition preferably converts at least a portion of the heavy metal in the gaseous feed stream to an elevated oxidation state. In the case of mercury, the composition preferably converts at least a portion of the mercury contained in the gaseous feed stream from a zero oxidation state to a +1 or a +2 oxidation state and also preferably removes mercury. "At least a portion", as used in this paragraph, can mean at least 20 weight %, preferably at least 30 weight %, and more preferably at least 50 weight % mercury based on the total amount of mercury contained in the gaseous feed stream.

The gaseous product stream preferably contains less than about 80 weight %, more preferably less than about 90 weight %, and most preferably less than about 95 weight % of the mercury contained in the gaseous feed stream.

The gaseous product stream is optionally contacted with a separate adsorbent in an adsorption zone. The adsorbent can be any adsorbent capable of adsorbing a heavy metal. More preferably, the adsorbent comprises, consists of or consists essentially of a material selected from the group consisting of a zeolite, amorphous carbon, and combinations thereof. The amorphous carbon can be an activated carbon or an activated charcoal. A treated gaseous product stream is withdrawn from the adsorption zone and contains less than 80 weight %, preferably less than 90 weight %, and more preferably less than 95 weight % of the heavy metal contained in the gaseous feed stream.

Examples

The following examples are intended to be illustrative of the present invention and to teach one of ordinary skill in the art to make and use the invention. These examples are not intended to limit the invention in any way.

Types of Supports

A. Fresh commercially available FCC catalyst.
B. Equilibrium FCC catalyst removed from a commercial unit.

C. Support prepared from alumina, perlite, and metakaolin clay. The procedure involves mixing 254 grams of Vista Dispal alumina, 900 grams of de-ionized water, and 300 grams of expanded crushed perlite. To this slurry, ASP-600 metakaolin clay from Engelhard and 240 grams of Darvan 821 A are added. The material is then heated to 150° C., held there for one hour, and then heated to 650° C. for one hour. This material is ground to 20 to 40 mesh particles (420 to 840 microns) before the impregnation step.

D. Gamma Alumina.

E. Delta Alumina.

Preparation of Sorbents

The preparation of the sorbents involves the addition of vanadium to the various supports. To a 2 molar solution of ammonium metavanadate ($NH_4VO_3$) in oxalic acid, hydrogen peroxide (30 wt. %) is added drop wise until approximately 10% of the weight of the ammonium metavanadate is obtained. (The red color of the solution suggests that vanadium is in +5 oxidation state). The solution is then impregnated onto the support by incipient wetness. Between impregnation steps, the vanadium-impregnated support is heated to 110° C. in a drying oven. After the final impregnation step, the material is calcined at a temperature that can range from 150° to 450° C.

Evaluation of Sorbents to Remove Mercury

The following procedure is used to test the ability of the sorbent to remove mercury from a gas stream. Mercury is added by passing an air stream at room temperature through a gas bottle containing elemental mercury. For the moist air runs, the air is passed through a bubbler prior to passing through the gas bottle containing mercury. The mercury containing gas stream is then passed through a sample tube containing approximately 0.5 to 1.5 grams of the sorbent to be tested. The tube is located in a furnace where the temperature can range from 110° to 170° C. The inlet and outlet elemental mercury concentrations are measured using a Jerome Mercury Analyzer. The efficiency of mercury removal is determined from the amount of mercury entering and leaving the solid sorbent, and is defined as the difference between the inlet and outlet mercury concentrations divided by the inlet concentration.

The table below summarizes the results obtained when passing mercury in dry or moist air (as indicated in the Table) over the various sorbents. In all cases, the contacting zone temperature is 150° C. while the gas hourly space velocity ranges from 2500 to 6000 hour −1. The removal efficiency is determined as a function of mercury uptake; i.e., the cumulative amount of mercury already adsorbed on the sample in units of micrograms of mercury per gram of sorbent (μg/g).

TABLE 1

Removal efficiency of mercury as function of support, amount of vanadium, calcination temperature, and mercury uptake.

| Support | Air | Wt. % V | Calcination Temperature (° C.) | Mercury Uptake (μg/g) | Removal Efficiency (%) |
|---|---|---|---|---|---|
| A | Dry | 11.2 | 300 | 2000 | 100 |
|   |     |      |     | 4000 | 98 |
|   |     |      |     | 9500 | 100 |
| B | Dry | 2.8  | 300 | 400 | 98 |
|   |     |      |     | 2000 | 96 |
|   |     |      |     | 3500 | 90 |
| B | Dry | 5.6  | 300 | 500 | 99 |
|   |     |      |     | 2500 | 99 |
|   |     |      |     | 5500 | 99 |
|   | Dry | 11.2 | 150 | 400 | 98 |

TABLE 1-continued

Removal efficiency of mercury as function of support, amount of vanadium, calcination temperature, and mercury uptake.

| Support | Air | Wt. % V | Calcination Temperature (° C.) | Mercury Uptake (μg/g) | Removal Efficiency (%) |
|---|---|---|---|---|---|
|   |     |      |     | 800 | 60 |
| B | Dry | 11.2 | 300 | 400 | 100 |
|   |     |      |     | 800 | 90 |
|   |     |      |     | 1200 | 86 |
| B | Dry | 11.2 | 350 | 400 | 99 |
| B | Dry | 11.2 | 375 | 300 | 70 |
| B | Dry | 11.2 | 450 | 400 | 50 |
| C | Dry | 8.9  | 300 | 5000 | 100 |
|   |     |      |     | 20000 | 100 |
|   |     |      |     | 35000 | 100 |
| D | Dry | 8.9  | 300 | 103 | 100 |
|   |     |      |     | 246 | 100 |
|   |     |      |     | 326 | 100 |
| D | Dry | 8.9  | 350 | 13 | 100 |
|   |     |      |     | 103 | 100 |
|   |     |      |     | 558 | 100 |
| D | Dry | 8.9  | 450 | 18 | 67 |
|   |     |      |     | 67 | 24 |
|   |     |      |     | 90 | 9 |
| D | Moist | 8.9 | 300 | 211 | 99 |
|   |     |      |     | 1659 | 100 |
|   |     |      |     | 4436 | 100 |
| E | Dry | 2.6  | 200 | 69 | 99 |
|   |     |      |     | 397 | 99 |
|   |     |      |     | 969 | 96 |
| E | Dry | 2.6  | 450 | 88 | 97 |
|   |     |      |     | 310 | 57 |
|   |     |      |     | 437 | 40 |
| E | Dry | 2.6  | 600 | 131 | 94 |
|   |     |      |     | 2052 | 91 |
|   |     |      |     | 4642 | 91 |
| E | Moist | 2.6 | 200 | 387 | 90 |
|   |     |      |     | 1104 | 96 |
|   |     |      |     | 1734 | 59 |
| E | Moist | 2.6 | 600 | 335 | 76 |
|   |     |      |     | 827 | 47 |
|   |     |      |     | 1169 | 8 |

The results in Table 1 clearly indicate that the efficiency of mercury removal depends upon various characteristics of the sorbent. Although all supports give high removal efficiencies, the perlite containing support (C) is more effective than the gamma alumina support (D) which is slightly more effective than the fresh FCC catalyst (A) that in turn is slightly more effective than the used FCC catalyst (B) which is more effective than the delta alumina support (E). The results also indicate that the performance of the sorbent strongly depends upon calcination temperature with calcination temperatures above 350° C. leading to less effective sorbents. The results further indicate that the presence of moisture in the air/mercury feed has a substantial effect on sorbent efficiency.

Characterization of Sorbents

In an effort to understand the relationship between structure and performance, a variety of techniques were used to characterize the sorbents. These include nuclear magnetic resonance, X-ray diffraction, and Raman spectroscopy. Description of these techniques and the results obtained are given below.

Solid-state $^{51}V$ NMR using magic angle spinning (MAS) and static wideline methods were used to characterize some of the sorbents. Spectra were obtained on a Varian INOVA 400 NMR spectrometer, operating at 399.8 MHz for $^1H$, and 105.1 MHz for $^{51}V$, using a MAS probe with 5 mm white zirconia rotors spinning at 10 to 12 KHz, or non-spinning (static). $^{51}V$ chemical shift was determined by using $NH_4VO_3$ as a secondary chemical shift reference at −576 ppm (and using VOCl$_3$ as a primary chemical shift reference at 0 ppm). This was accomplished by running the sample at two different spinning frequencies, 10 and 12 kHz, to distinguish the isotropic chemical shift peak from the sidebands. With reference to FIG. 1, the V-51 MAS and static spectra of 11.2 wt. % vanadium supported on used FCC catalyst (support B) show a distinct difference between the two low temperature calcined samples (300° and 350° C.) and the two higher temperature calcined samples (375° and 450° C.). The low temperature samples have broader peaks in the MAS but narrower width of static spectra. These results suggest that vanadium oxide is predominantly in an amorphous state for calcination temperatures of 350° C. and below. However, as the calcination temperature increases, the vanadium forms crystalline V$_2$O$_5$.

X-ray diffraction measurements were made on a PanAnalytical Expert Pro Diffractometer with an accelerator linear array detector and a copper Kα source. Three samples were evaluated by XRD—11.2 wt. % vanadium supported on a used FCC catalyst (support B) that was calcined either at 300°, 350°, or 450° C. With reference to FIGS. 2-4, the 450° C. calcined samples show evidence of crystalline V$_2$O$_5$. The lower temperature calcined samples show no evidence of crystalline V$_2$O$_5$, but do indicate a presence of amorphous vanadates.

A LabRam Infinity Raman Microscope (JY Horiba, Inc.) was used to evaluate 11.2 wt. % vanadium samples on used FCC catalysts (support B) calcined at various temperatures. The instrument utilizes an Olympus BX40 microscope and is enclosed in a light-sensitive box to avoid fluorescence interferences from room lights. A 532 nm laser and an 80 times objective are used for all analyses. With reference to FIGS. 5-6, the results indicate that calcination temperatures above 350° C. induce the formation of crystalline V$_2$O$_5$. The Raman results suggest the presence of polymeric-type amorphous vanadium at calcination temperatures of 350° C. and lower.

That which is claimed is:

1. A process comprising:
    a) contacting, in a contacting zone, a gaseous feed stream comprising a heavy metal and oxygen with a composition prepared by the method of:
        a) incorporating a vanadium compound onto, into, or onto and into a support selected from the group consisting of: 1) amorphous silica-alumina; 2) a zeolite; 3) a material comprising meta-kaolin, alumina, and expanded perlite; 4) alumina; and 5) combinations thereof, in the presence of an oxidizing agent and a solvent, to thereby form a vanadium incorporated support; and
        b) calcining said vanadium incorporated support at a calcination temperature; wherein said calcination temperature is sufficient to volatilize and remove substantially all of the solvent; and wherein said calcination temperature is below the temperature which would result in the conversion of greater than about 90 weight percent of the vanadium to vanadium-and-oxygen-containing crystallites greater than about 100 Å in size, to thereby form said composition; and
    b) withdrawing a gaseous product stream from said contacting zone.

2. A process as recited in claim 1 wherein said gaseous product stream contains less heavy metal than said gaseous feed stream.

3. A process as recited in claim 1 wherein said gaseous feed stream further comprises a compound selected from the group consisting of sulfur oxides, CO$_2$, water, nitrogen oxides, HCl, and combinations of any two or more thereof.

4. A process as recited in claim 1 wherein said gaseous feed stream is a combustion gas.

5. A process as recited in claim 1 wherein said gaseous feed stream is a stack gas derived from the combustion of coal.

6. A process as recited in claim 1 wherein said contacting of step a) is carried out at a temperature in the range of from about 100 to about 275° C.

7. A process as recited in claim 1 wherein said contacting of step a) is carried out at a temperature in the range of from about 125 to about 225° C.

8. A process as recited in claim 1 wherein said heavy metal comprises a metal selected from the group consisting of arsenic, beryllium, lead, cadmium, chromium, nickel, zinc, mercury, barium, and combinations of any two or more thereof.

9. A process as recited in claim 8 wherein said heavy metal is mercury.

10. A process as recited in claim 9 wherein said composition converts at least a portion of said mercury in said gaseous feed stream from a zero oxidation to a +1 or a +2 oxidation state.

11. A process as recited in claim 9 wherein said mercury is present in said gaseous feed stream in an amount in the range of from about 0.1 to about 10,000 μg/m$^3$.

12. A process as recited in claim 9 wherein said mercury is present in said gaseous product stream in an amount in the range of from about 1 to about 800 μg/m$^3$.

13. A process as recited in claim 9 wherein said mercury is present in said gaseous product stream in an amount in the range of from about 3 to about 700 μg/m$^3$.

14. A process as recited in claim 9 wherein said gaseous product stream contains less than about 80 weight % of the mercury contained in said gaseous feed stream.

15. A process as recited in claim 9 wherein said gaseous product stream contains less than about 90 weight % of the mercury contained in said gaseous feed stream.

16. A process as recited in claim 9 wherein said gaseous product stream contains less than about 95 weight % of the mercury contained in said gaseous feed stream.

17. A process as recited in claim 1 wherein said gaseous product stream is contacted, in an adsorption zone, with an adsorbent selected from the group consisting of a zeolite, amorphous carbon, and combinations thereof.

18. A process as recited in claim 17 wherein said composition oxidizes at least a portion of said heavy metal in said gaseous feed stream to an elevated oxidation state.

19. A process as recited in claim 17 wherein said heavy metal is mercury and wherein said composition oxidizes at least a portion of said mercury in said gaseous feed stream from a zero oxidation state to a +1 or a +2 oxidation state.

20. A process as recited in claim 17 wherein a treated gaseous product stream is withdrawn from said adsorption zone, and wherein said treated gaseous product stream contains less than about 95 weight % of the heavy metal contained in the gaseous feed stream.

* * * * *